(12) United States Patent
Bai et al.

(10) Patent No.: US 9,071,345 B2
(45) Date of Patent: Jun. 30, 2015

(54) METHOD AND SYSTEM FOR OBTAINING AN IDLE SPECTRUM

(75) Inventors: Wenling Bai, Beijing (CN); Chenggang Jiang, Beijing (CN); Yuanyuan Li, Beijing (CN); Yu Yang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/122,618

(22) PCT Filed: Mar. 27, 2012

(86) PCT No.: PCT/CN2012/073141
§ 371 (c)(1),
(2), (4) Date: Nov. 26, 2013

(87) PCT Pub. No.: WO2012/163162
PCT Pub. Date: Dec. 6, 2012

(65) Prior Publication Data
US 2014/0185653 A1    Jul. 3, 2014

(30) Foreign Application Priority Data

Jun. 2, 2011  (CN) .......................... 2011 1 0147674

(51) Int. Cl.
*H04B 7/00* (2006.01)
*H04B 1/713* (2011.01)
(Continued)

(52) U.S. Cl.
CPC ........... *H04B 1/713* (2013.01); *H04W 52/0219* (2013.01); *H04W 16/14* (2013.01);
(Continued)

(58) Field of Classification Search
CPC ..... H04W 16/14; H04W 24/00; H04W 28/16; H04W 72/0453; H04W 72/04; H04W 72/082; H04W 72/00; H04W 72/085; H04W 28/08; H04W 28/20; H04W 16/10; H04W 24/02; H04W 28/18; H04W 28/26; H04W 24/10; H04L 43/0882; H04B 1/7097; H04B 1/719; Y02B 60/50
USPC ...................... 455/434, 450–455, 456.1–457, 455/507–516, 179.1, 180.1, 185.1, 455/115.1–115.4
See application file for complete search history.

(56) References Cited

U.S. PATENT DOCUMENTS

2006/0141998 A1* 6/2006 Kennedy et al. ............... 455/423
2009/0088083 A1* 4/2009 Fujii et al. ....................... 455/69
(Continued)

FOREIGN PATENT DOCUMENTS

| CN | 101667872 A | 3/2010 |
|---|---|---|
| CN | 101667874 A | 3/2010 |

(Continued)

OTHER PUBLICATIONS

International Preliminary Report on Patentability (Chapter I) (in English and Chinese) for PCT/CN2012/073141, mailed Jun. 28, 2012; ISA/CN.
(Continued)

*Primary Examiner* — Allahyar Kasraian
(74) *Attorney, Agent, or Firm* — Harness, Dickey & Pierce, P.L.C.

(57) ABSTRACT

The present disclosure provides a method and an apparatus for obtaining an idle spectrum. The method includes: obtaining, by a central management unit, configuration information of a transmitter of an authorized system, and obtaining geographic location information of candidate sense nodes;

selecting, by the central management unit, sense nodes from the candidate sense nodes according to the configuration information and the geographic location information, and informing the selected sense nodes to perform spectrum sensing; and receiving, by the central management unit, sensing results of the selected sense nodes, and obtaining information of an idle spectrum according to the sensing results.

16 Claims, 2 Drawing Sheets

(51) Int. Cl.
    *H04W 52/02* (2009.01)
    *H04W 16/14* (2009.01)
    *H04L 27/00* (2006.01)
    *H04L 27/26* (2006.01)
    *H04W 28/16* (2009.01)
    *H04W 84/18* (2009.01)
    *H04B 17/27* (2015.01)

(52) U.S. Cl.
    CPC ............ *Y02B 60/50* (2013.01); *H04L 27/0006* (2013.01); *H04W 52/0245* (2013.01); *H04L 27/2626* (2013.01); *H04W 28/16* (2013.01); *H04W 84/18* (2013.01); *H04B 17/27* (2015.01)

(56) References Cited

U.S. PATENT DOCUMENTS

2009/0185529 A1\* 7/2009 Tsuji et al. ............... 370/329
2010/0105419 A1\* 4/2010 Kim et al. ............... 455/509
2010/0137014 A1   6/2010 Rao et al.

FOREIGN PATENT DOCUMENTS

| | | |
|---|---|---|
| CN | 101754402 A | 6/2010 |
| CN | 101917738 A | 12/2010 |
| CN | 102223191 A | 10/2011 |

OTHER PUBLICATIONS

International Search Report for PCT/CN2012/073141, ISA/CN, mailed Jun. 28, 2012.
Chinese Office Action for Application No. 201110147674.0 dated Mar. 22, 2013, and its English translation thereof.
Chinese Office Action for Application No. 201110147674.0 dated Jun. 20, 2013, and its English translation thereof.
Chinese Office Action for Application No. 201110147674.0 dated Dec. 2, 2013, and its English translation thereof.
Chinese Office Action for Application No. 201110147674.0 dated Apr. 3, 2014, and its English translation thereof.

\* cited by examiner

METHOD AND SYSTEM FOR OBTAINING AN IDLE SPECTRUM

PRIORITY STATEMENT

This application is a 371 U.S. National Phase application of PCT/CN2012/073141, filed Mar. 27, 2012, entitled METHOD AND SYSTEM FOR OBTAINING AN IDLE SPECTRUM, which claims the benefit of Chinese Patent Application No. 201110147674.0, entitled "method and apparatus for obtaining an idle spectrum" filed on Jun. 2, 2011, the disclosure of which is incorporated herein in its entirety by reference.

FIELD OF THE INVENTION

The present invention relates to telecommunication techniques, and more particularly, to a method and an apparatus for obtaining an idle spectrum.

BACKGROUND OF THE INVENTION

With rapid development of wireless communication techniques, conflicts between increasing wideband wireless communication requirements and limited spectrum resources become more and more apparent. Conventional spectrum management techniques allocate spectrum resources in a relative fixed manner and cannot adjust the allocation rapidly and adaptively with requirements. Although digital signal processing techniques such as multiple input multiple output (MIMO) and high level modulation may increase a spectrum utilization ratio, the problem that the spectrum resources are limited cannot be solved. Many spectrum resources allocated to existing wireless communication systems have idle spectrums, which blocks the access of potential wireless communication systems.

Based on the above, cognitive radio (CR) technique attracts people's eyes. The idea of the CR technique is: without affecting normal operation of an authorized system on an authorized frequency band, a wireless communication device with a cognitive function access an idle spectrum of the authorized frequency band in an opportunistic manner and dynamically uses the spectrum. Thus, the wireless communication device is able to find an idle spectrum and utilize the idle spectrum reasonably. The problem of unreasonable utilization of the spectrum resources due to fixedly allocation of the spectrum may be solved.

In the CR technique, the obtaining of the idle spectrum is a premise of the normal operating of the wireless communication system. The wireless communication system has to ensure the accuracy of the idle spectrum obtained, so as to avoid harmful interference to the authorized system. In addition, the wireless communication system needs to decrease the complexity for obtaining the idle spectrum and reduce system overhead as much as possible, so as to reduce the implementation complexity and cost of the wireless communication system.

In an existing technique, the obtaining of the idle spectrum is realized through spectrum sensing. A wireless communication system (e.g., LTE) deployed on an authorized frequency band determines whether the authorized frequency band is occupied by the authorized system through detecting an energy or signal characteristic of the authorized system, so as to identify the idle spectrum of the authorized frequency band in a specific time domain and a specific space domain. Thus, the wireless communication system can access the idle spectrum and maintains idle spectrum information.

Currently, there are a single-node-based spectrum sensing technique and a cooperative spectrum sensing technique. In the single-node-based spectrum sensing technique, a sense node of the wireless communication system determines whether the authorized frequency band is occupied by the authorized system through detecting the energy or signal characteristic of the authorized system, and then obtains the idle spectrum on the authorized frequency band. This sense result is effective within a small area. In the cooperative spectrum sensing technique, multiple adjacent sense nodes of the wireless communication system sense the same frequency band within the authorized frequency band. The sensed results of the cooperative sense nodes are combined. The combined result is effective within a small area.

SUMMARY OF THE INVENTION

Examples of the present invention provide a method and an apparatus for obtaining an idle spectrum, so as to reduce power consumption of sense nodes and increase accuracy ratio for determining the idle spectrum.

According to an example of the present disclosure, a method for obtaining an idle spectrum is provided. The method includes:

obtaining, by a central management unit, configuration information of a transmitter of an authorized system, and obtaining geographic location information of candidate sense nodes;

selecting, by the central management unit, sense nodes from the candidate sense nodes according to the configuration information and the geographic location information, and informing the selected sense nodes to perform spectrum sensing; and receiving, by the central management unit, sensing results of the selected sense nodes, and obtaining information of an idle spectrum according to the sensing results.

According to another example of the present disclosure, an apparatus for obtaining an idle spectrum is provided. The apparatus includes:

one or more processors;
a memory; and
one or more program modules stored in the memory and to be executed by the one or more processors, the one or more program modules include:
a first obtaining module, adapted to obtain configuration information of a transmitter of an authorized system and obtain geographic location information of candidate sense nodes;
a selecting module, adapted to select sense nodes according to the configuration information and the geographic location information;
a transmitting module, adapted to inform the sense nodes to perform spectrum sensing;
a receiving module, adapted to receive sensing results of the sense nodes; and a second obtaining module, adapted to determine information of an idle spectrum according to the sensing results.

Compared with the existing techniques, the solution of the present disclosure has at least the following advantages:

The sense nodes are selected according to the configuration information of the transmitter of the authorized system and the geographic location information of candidate sense nodes. The idle spectrum is obtained via the sense nodes. Thus, the number of the sense nodes used for sensing spectrum in the CR-based wireless communication system is reduced. The number of frequency bands need to be sensed by each sense node is reduced. A total power consumption and a signaling overhead of the wireless communication system are reduced. Through selecting the sense nodes with high accuracy, the accuracy ratio for determining the idle spectrum is increased and the influence of the wireless communication system to the authorized system is decreased.

DETAILED DESCRIPTION OF THE INVENTION

The inventor of the present disclosure finds the following during the implementation of the present disclosure.

The CR technique may dynamically use idle spectrums of an authorized frequency band without affecting normal operation of an authorized system, so as to solve a problem between limited spectrum resources and idle resources of the authorized spectrum. In a wireless communication system where the CR technique is adopted, the idle spectrum of the authorized frequency band is obtained and utilized. If the authorized system transmits again, the authorized spectrum is given back to the authorized system, so as to avoid interference to the authorized system.

In order to obtain the idle spectrum, a single-node-based spectrum sensing technique or a cooperative spectrum sensing technique may be adopted. With respect to problems existed in conventional single-node-based spectrum sensing and cooperative spectrum sensing techniques, an example of the present disclose provides a method and an apparatus for obtaining an idle spectrum, so as to obtain the idle spectrum based on configuration information of a transmitter of the authorized system. In examples of the present disclosure, during the obtaining of the idle spectrum of the CR-based wireless communication system, an operation of sense node selection and configuration is performed, which reduces the number of sense nodes used for sensing spectrum in the wireless communication system, reduces the number of frequency bands needs to be sensed by each sense node, reduces a total power consumption and cost, and also reduces signaling overhead. Through selecting sense nodes with higher sense accuracy, the accuracy ratio for obtaining the idle spectrum is increased.

Hereinafter, the technical solution provided by the present disclosure is described in detail with reference to accompanying drawings and examples. The following examples are merely some exemplary embodiments but do not form all embodiments of the present disclosure. Based on the following examples, one of ordinary skill in the art may obtain many variations without an inventive work, which are also within the protection scope of the present disclosure.

A First Example

Figure 1:
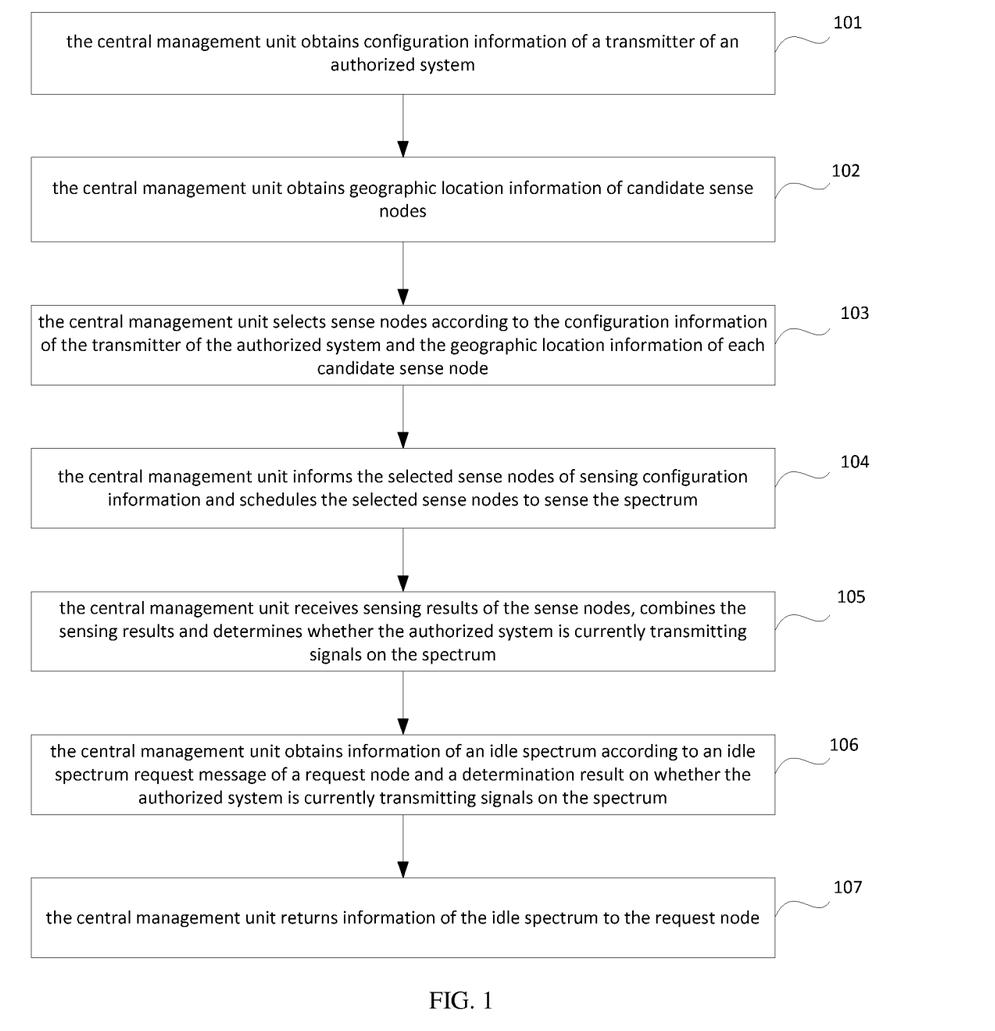
FIG. 1 is a flowchart illustrating a method for obtaining an idle spectrum according to a first example of the present disclosure.

The first example of the present disclosure provides a method for obtaining an idle spectrum. The method involves a central management unit, sense nodes and a request node. The central management unit may be located on a repeater device, a base station, a radio network controller (RNC) or a gateway device. The sense node refers to a node which has an ability of sensing spectrum. The sense node may be located on a terminal device, a repeater device, a base station or configured as an independent sense node. The request node may be a sense node or a common node. The common node does not have the ability of sensing spectrum and requires idle spectrum for wireless transmission. The common node may be located on a terminal device, a repeater device or a base station. As shown in FIG. 1, the method includes the following.

At block 101, the central management unit obtains configuration information of a transmitter of an authorized system. The configuration information includes but is not limited to any one or any combination of: geographic location information of the transmitter of the authorized system, spectrum information of the transmitter of the authorized system, and transmission power information of the transmitter of the authorized system.

The central management unit may obtain the configuration information through accessing a database. Or, the central management unit may also obtain the configuration information via a spectrum measurement manner (i.e., measure in advance). Or, the central management unit may also obtain the configuration information via assistance of the authorized system.

In the example, the central management unit may divide the spectrum configured for each transmitter of the authorized system into several channels. Channel information may identify a central frequency and bandwidth information.

At block 102, the central management unit obtains geographic location information of candidate sense nodes. Blocks 101 and 102 have no strict order. Block 102 may also be executed prior to block 101.

Each candidate sense node may obtain the geographic location information of its own (e.g., geographic coordinates) through a geographic locating manner (e.g., GPS manner or any other geographic locating manner) and transmit its geographic location information to the central management unit. The central management unit receives and obtains the geographic location information of each candidate sense node. A message format for reporting the geographic location information of each candidate sense node may be as shown in table 1.

TABLE 1

| Sense node ID | n1 bits |
|---|---|
| Geographic coordinates of the sense node | n2 bits |

At block 103, the central management unit selects sense nodes according to the configuration information of the transmitter of the authorized system and the geographic location information of each candidate sense node, i.e., selects a sense node set for each channel of the transmitter of the authorized system.

The central management unit determines, according to configured transmission power information $P_S$ of the transmitter of the authorized system and a detecting threshold $P_T$, a maximum propagation loss $L_{max}$ between the candidate sense nodes meeting the requirement of the detecting threshold the transmitter of the authorized system, i.e., the central management unit calculates $L_{max}[dB]=P_S[dB]-P_T[dB]$.

The central management unit calculates, according to a wireless channel propagation model and the maximum propagation loss $L_{max}$, a maximum distance $d_{max}$ between the candidate sense nodes meeting the requirement of the detecting threshold and the transmitter of the authorized system, i.e., the central management unit solves $W(d_{max})=L_{max}$ to obtain $d_{max}$. $W(.)$ denotes a function of the wireless channel propagation model. The wireless channel propagation model may be a hata model which provides a relationship between propagation loss and propagation distance. In the present disclosure, the wireless channel propagation model may be selected properly according to characteristics of the authorized system.

The central management unit selects sense nodes for each transmitter of the authorized system according to the geographic location information of the transmitter of the authorized system, the geographic location information of the candidate sense nodes and the maximum distance $d_{max}$, i.e., the central management unit selects, from candidate sense nodes which have a distance not larger than $d_{max}$ from the transmitter of the authorized system, a designated number of candidate sense nodes as the sense nodes.

In the example of the present disclosure, the central management unit may select and configure the sense node set for each channel (i.e., spectrum, the spectrum is divided into several channels) of each transmitter of the authorized system according to the geographic location information of the transmitter of the authorized system, the geographic location information of each candidate sense node and the maximum distance $d_{max}$. For each channel of the transmitter of the authorized system, the central management unit selects, from all candidate sense nodes which have a distance not larger than $d_{max}$ from the transmitter of the authorized system, several sense nodes most close to the transmitter of the authorized system. Multiple sense nodes may be configured for each channel of each transmitter of the authorized system. One sense node may sense spectrum on multiple configured channels.

At block 104, the central management unit informs the selected sense nodes of sensing configuration information and schedules the selected sense nodes to sense the spectrum. In the example of the present disclosure, the central management unit transmits a sense node selection and configuration result to the selected sense nodes via a sense configuration message, and schedules the selected sense nodes to sense the spectrum.

At block 105, the central management unit receives sensing results of the sense nodes, combines the sensing results and determines whether the authorized system is currently transmitting signals on the spectrum.

After receiving the sensing results reported by the configured sense nodes, the central management unit combines the sensing results and determines whether the transmitter of the authorized system is transmitting signals on the spectrum. For one channel of one transmitter, the central management unit may combine the sensing results of multiple sense nodes according to a conventional and/or principle, or adopts other combining principles to combine the sensing results, so as to determine whether the transmitter of the authorized system is transmitting signals on the spectrum.

At block 106, the central management unit obtains information of an idle spectrum according to an idle spectrum request message of a request node and a determination result on whether the authorized system is currently transmitting signals on the spectrum.

Before this block, the request node transmits the idle spectrum request message to the central management unit according to a spectrum resource requirement of the request node. The central management unit receives the idle spectrum request message transmitted by the request node (e.g., a sense node or a common node). The idle spectrum request message carries geographic location information of the request node. In addition, the idle spectrum request message may further include a list of channels supported by the request node. The idle spectrum request message may further include a maximum transmission power of the request node. A message format of the idle spectrum request message may be as shown in table 2.

TABLE 2

| Node ID | n1 bits |
|---|---|
| Node geographic location | n2 bits |
| Node radio frequency capability | n3 bits |
| Node maximum transmission power | n4 bits |

In this block, (1) if the idle spectrum request message carries the geographic location information of the request node (suppose that the idle spectrum request message does not carry the maximum transmission power of the request node), the central management unit calculates a geographic distance d between the transmitter of the authorized system and the request node according to the geographic location information of the request node and the geographic location information of the transmitter of the authorized system which is transmitting signals on the spectrum, i.e., calculates the geographic distance d according to the geographic location of the request node and the geographic locations of all transmitters which are configured with the channel and are transmitting signals on the channel.

The central management unit calculates a receiving signal strength $P_R$ from each transmitter meeting the above condition (i.e., each transmitter which is configured with the channel and is transmitting signals on the channel) to the request node according to the geographic distance d and the wireless channel propagation model. The central management unit calculates $P_R[dB]=P_S[dB]-L[dB]$, $L=W(d)$. $W(.)$ denotes a function of the wireless channel propagation model, $P_S$ denotes configured transmission power information.

The receiving signal strength $P_R$ is compared with the detecting threshold $P_T$. If the receiving signal strength $P_R$ is lower than the detecting threshold $P_T$, the central management unit determines that the spectrum is idle; otherwise, the central management unit determines that the spectrum is not idle (i.e., the spectrum is occupied).

(2) if the idle spectrum request message carries the maximum transmission power of the request node, if the request node transmits using the maximum transmission power, the central management unit may calculate, via a network analysis and simulation method, an interference level suffered by the authorized system which is transmitting signals on the spectrum (i.e., all authorized systems configured with the channel and transmitting on the channel). The interference level may be evaluated by a parameter such as a coverage ratio loss of the transmitter of the authorized system, or a drop rate of the authorized system or a capacity loss of the authorized system.

If the interference level is lower than a predefined threshold, the central management unit determines that the spectrum is idle; otherwise, the central management unit determines that the spectrum is not idle (i.e., the spectrum is occupied).

(3) If the idle spectrum request message carries a list of spectrums supported by the request node, the central management unit determines a target spectrum set according to the supported spectrum list, and then determines whether each spectrum in the target spectrum list is idle.

In the example of the present disclosure, the central management unit may determine the target channel list firstly. If the idle spectrum request message of the request node carries the supported spectrum list, the central management unit determines whether each channel supported by the request node is idle. Otherwise, the central management unit determines whether each authorized spectrum is idle, so as to obtain the idle channel set of the request node. Thereafter, the center management unit determines whether each channel of the request node is idle. The foregoing method (1) or (2) may be adopted for a detailed determination process.

At block 107, the central management unit returns information of the idle spectrum to the request node. The central management unit may return a determined idle channel list to the request node via an idle spectrum response message. The request node receives the idle spectrum response message returned by the central management unit, so as to obtain the idle channel list and select an appropriate idle channel to access according to its spectrum requirement to implement wireless traffic transmission.

The technical solution provided by the example of the present disclosure may be applied in a time division-synchronous code division multiple access (TD-SCDMA) system, a wideband code division multiple access (WCDMA) system, a long term evolution (LTE) system, an LTE-Advanced (LTE-A) system, an institute of electrical and electronics engineers (IEEE) 802.16 system.

Through the above technical solution provided by the example of the present disclosure, the number of sense node used for spectrum sensing in a CR-based wireless communication system may be reduced. The number of spectrums that each sense node has to sense is also reduced. A total power consumption and a signaling overhead of the wireless communication system are decreased. Through selecting sense nodes with higher sense accuracy, the accuracy ratio for determining the idle spectrum is increased and the impact of the wireless communication system to the authorized system is reduced.

A Second Example

Figure 2:
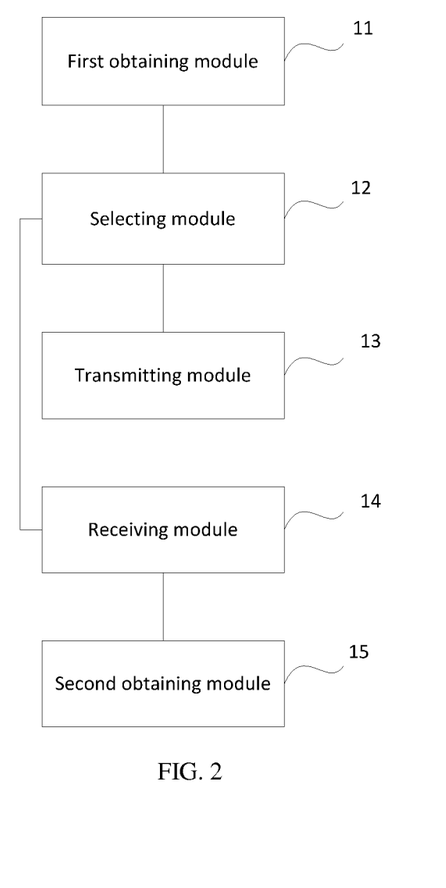
FIG. 2 is a schematic diagram illustrating a structure of an apparatus for obtaining an idle spectrum according to a second example of the present disclosure.

Based on a similar idea of the above method example, an example of the present disclosure provides an apparatus for obtaining an idle spectrum. As shown in FIG. 2, the apparatus includes the following:

a first obtaining module 11, adapted to obtain configuration information of a transmitter of an authorized system and obtain geographic location information of candidate sense nodes;

a selecting module 12, adapted to select sense nodes according to the configuration information and the geographic location information;

a transmitting module 13, adapted to inform the sense nodes to perform spectrum sensing;

a receiving module 14, adapted to receive sensing results of the sense nodes; and a second obtaining module 15, adapted to determine information of an idle spectrum according to the sensing results.

The configuration information includes any one or any combination of: geographic location information of the transmitter of the authorized system, spectrum information of the transmitter of the authorized system, and transmission power information of the transmitter of the authorized system. The first obtaining module 11 is further adapted to obtain the configuration information through accessing a database, or via a spectrum measurement manner, or via assistance of the authorized system.

The first obtaining module 11 is further adapted to receive the geographic location information reported by each candidate sense node, wherein the geographic location information is obtained by each candidate sense node through geographic locating.

The configuration information includes: geographic location information of the transmitter of the authorized system, spectrum information of the transmitter of the authorized system, and transmission power information of the transmitter of the authorized system. The selecting module 12 is further adapted to calculate a maximum propagation loss $L_{max}$ between the candidate sense nodes and the transmitter of the authorized system according to the configured transmission power information $P_S$ of the transmitter of the authorized system and a detecting threshold $P_T$;

calculate a maximum distance $d_{max}$ between the candidate sense nodes and the transmitter of the authorized system according to the maximum propagation loss $L_{max}$;

select sense nodes for each transmitter of the authorized system according to the geographic location information of the transmitter of the authorized system, the geographic location information of each candidate sense node and the maximum distance $d_{max}$.

The selecting module 12 is further adapted to calculate $L_{max}[dB]=P_S[dB]-P_T[dB]$, and calculate $d_{max}$ through solving $W(d_{max})=L_{max}$, wherein $W(.)$ denotes a function of a wireless channel propagation model.

The selecting module 12 is further adapted to select, from candidate sense nodes having a distance not larger than $d_{max}$ from the transmitter of the authorized system, a designated number of candidate sense nodes most close to the transmitter of the authorized system as sense nodes.

The second obtaining module 15 is adapted to combine the sensing results to determine whether the authorized system is transmitting signals on the spectrum and obtain information of the idle spectrum according to an idle spectrum request message of a request node and a determination result on whether the authorized system is currently transmitting signals on the spectrum.

The idle spectrum request message carries the geographic location information of the request node. The second obtaining module 15 is further adapted to calculate a geographic distance d between the transmitter of the authorized system and the request node according to the geographic location information of the request node and the geographic location information of the transmitter of the authorized system which is transmitting signals on the spectrum;

calculate a receiving signal strength $P_R$ from the transmitter of the authorized system to the request node according to the geographic distance d;

determine, if the receiving signal strength $P_R$ is lower than a detecting threshold $P_T$, that the spectrum is idle; and determine that the spectrum is not idle if otherwise.

The second obtaining module 15 is further adapted to calculate $P_R[dB]=P_S[dB]-L[dB]$, $L=W(d)$; wherein $W(.)$ is a function of the wireless channel propagation model, $P_S$ denotes the configured transmission power information.

The idle spectrum request message carries the maximum transmission power of the request node. The second obtaining module 15 is further adapted to calculate, if the request node transmits using the maximum transmission power, an interference level suffered by the authorized system which is transmitting signals on the spectrum, determine that the spectrum is idle if the interference level is lower than a predefined threshold; and determine the spectrum is not idle if otherwise.

The interference level may be evaluated by a parameter such as coverage ratio loss of the transmitter of the authorized system, or a drop rate of the authorized system or a capacity loss of the authorized system. The idle spectrum request message carries a list of spectrums supported by the request node. The second obtaining module 15 is further adapted to determine a target spectrum set according to the supported spectrum list and determine whether each spectrum in the target spectrum set is idle.

The apparatus for obtaining the idle spectrum may be a central management unit located on a repeater device, a base station, an RNC device or a gateway device. The sense node is a node having a capability of sensing spectrum, located on a terminal device, a repeater device, a base station, or an independently configured sense node. The request node may be a sense node or a common node which does not have the sense capability and needs idle spectrum to realize wireless transmission. The common node may be located on a terminal device, a repeater device or a base station.

The modules in the example of the present disclosure may be integrated together or disposed separately. The above modules may be combined into one module or divided into multiple sub-modules.

Through the above descriptions, those with ordinary skill in the art would know that the present disclosure may be implemented in form of software and a necessary hardware platform, or implemented by hardware. But the former is better in most cases. Base on this, the technical solution of the present disclosure or the contribution part may be embodied in form of software product stored on a storage medium. The software product includes a set of instructions executable by a computer (e.g., personal computer, server, or network device) to execute the methods described with reference to each example of the present disclosure.

The drawings merely show some schematic diagrams of examples, not all the modules or blocks in the drawings are necessary for implementing the present disclosure.

It is apparent for those with ordinary skill in the art that, the modules in the apparatus may be disposed in the apparatus according to the description of the examples, or may be disposed in one or more apparatuses after corresponding variation. The modules may be combined into one module or divided into multiple sub-modules.

The serial numbers of the examples are merely used for facilitating the description, but are not intended to denote preference of the examples.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for obtaining an idle spectrum, comprising:
   obtaining, by a central management unit, configuration information of a transmitter of an authorized system, and obtaining geographic location information of candidate sense nodes; wherein the configuration information comprises: geographic location information of the transmitter of the authorized system, spectrum information of the transmitter of the authorized system and transmission power information of the transmitter of the authorized system;
   selecting, by the central management unit from the candidate sense nodes, a designated number of sense nodes which are closest to the transmitter of the authorized system from the candidate sense nodes according to the configuration information and the geographic location information, and informing the selected sense nodes to perform spectrum sensing; and
   receiving, by the central management unit, sensing results of the selected sense nodes, and obtaining information of an idle spectrum according to the sensing results;
   wherein the obtaining the information of the idle spectrum according to the sensing results comprises:
   combining, by the central management unit, the sensing results and determining whether the authorized system is currently transmitting signals on the spectrum; and
   obtaining, by the central management unit, the information of the idle spectrum for a request node according to an idle spectrum request message of the request node and a determination result on whether the authorized system is currently transmitting signals on the spectrum;
   wherein the idle spectrum request message carries maximum transmission power information of the request node;
   the obtaining the information of the idle spectrum for the request node according to the idle spectrum request message of the request node and the determination results on whether the authorized system is currently transmitting signals on the spectrum comprises:
   if the request node transmit using the maximum transmission power, calculating, by the central management unit, an interference level suffered by the authorized system transmitting on the spectrum;
   if the interference level is lower than a preconfigured threshold, determining, by the central management unit, that the spectrum is not idle; otherwise, determining, by the central management unit, that the spectrum is not idle.

2. The method of claim 1, wherein the configuration information comprises any one or any combination of: geographic location information of the transmitter of the authorized system, spectrum information of the transmitter of the authorized system, and transmission power information of the transmitter of the authorized system;
   the obtaining the configuration information of the transmitter of the authorized system comprises:
   obtaining, by the central management unit, the configuration information through accessing a database, or through a spectrum measurement manner, or via assistance of the authorized system.

3. The method of claim 1, wherein the obtaining the geographic location information of the candidate sense nodes comprises:
   receiving, by the central management unit, the geographic location information reported by each candidate sense node; wherein each candidate sense node obtains its geographic location information by a geographic locating manner.

4. The method of claim 1, wherein
   the selecting the designated number of sense nodes which are closet to the transmitter of the authorized system from the candidate sense nodes according to the configuration information and the geographic location information comprises:
   calculating, by the central management unit, a maximum propagation loss $L_{max}$ between the candidate sense nodes and the transmitter of the authorized system according to the transmitter power information $P_S$ of the transmitter of the authorized system and a detecting threshold $P_T$;
   calculating, by the central management unit, a maximum distance $d_{max}$ between the candidate sense nodes and the transmitter of the authorized system according to the maximum propagation loss $L_{max}$; and selecting, by the central management unit, the designated number of sense nodes which are closet to the transmitter of the authorized system from the candidate sense nodes for the transmitter of the authorized system according to the geographic location information of the transmitter of the authorized system, the geographic location information of the candidate sense nodes and the maximum distance $d_{max}$.

5. The method of claim 4, wherein the calculating the maximum propagation loss $L_{max}$ between the candidate sense nodes and the transmitter of the authorized system according to the transmission power information $P_S$ and the detecting threshold $P_T$ comprises:

calculating, by the central management unit, $L_{max}[dB]=P_S[dB]-P_T[dB]$;

the calculating the maximum distance $d_{max}$ between the candidate sense nodes and the transmitter of the authorized system according to the maximum propagation loss $L_{max}$ comprises:

calculating, by the central management unit, $d_{max}$ through solving $W(d_{max})=L_{max}$, wherein $W(.)$ denotes a wireless channel propagation model function.

6. The method of claim 4, wherein the selecting the designated number of sense nodes which are closet to the transmitter of the authorized system for the transmitter of the authorized system according to the geographic location information of the transmitter of the authorized system, the geographic location information of the candidate location information and the maximum distance $d_{max}$ comprises:

selecting, by the central management unit, the designated number of candidate sense nodes closest to the transmitter of the authorized system from the candidate sense nodes which have a distance not larger than $d_{max}$ from the transmitter of the authorized system.

7. The method of claim 1, wherein the idle spectrum request message carries geographic location information of the request node;

the obtaining the information of the idle spectrum for the request node according to the idle spectrum request message of the request node and the determination result on whether the authorized system is currently transmitting signals on the spectrum comprises:

calculating, by the central management unit, a geographic distance d between the transmitter of the authorized system and the request node according to the geographic location information of the transmitter of the authorized system and the geographic location information of the request node;

calculating, by the central management unit, a receiving signal strength $P_R$ from the transmitter of the authorized system to the request node to according to geographic distance d; and if the receiving signal strength $P_R$ is lower than a detecting threshold $P_T$, determining, by the central management unit, that the spectrum is idle; otherwise, determining, by the central management unit, that the spectrum is not idle.

8. The method of claim 7, wherein the calculating the receiving signal strength $P_R$ from the transmitter of the authorized system to the request node according to the geographic distance d comprises:

calculating, by the central management unit, $P_R[dB]=P_S[dB]-L[dB]$, wherein $L=W(d)$, $W(.)$ denotes a wireless channel propagation model function, $P_S$ denotes the power transmission information.

9. The method of claim 1, wherein the idle spectrum request message carries a list of spectrums supported by the request node;

the obtaining the information of the idle spectrum for the request node according to the idle spectrum request message of the request node and the determination result on whether the authorized system is currently transmitting signals on the spectrum comprises:

determining, by the central management unit, a target spectrum set according to the list of spectrums supported by the request node, and determining whether each spectrum in the target spectrum set is idle.

10. An apparatus for obtaining an idle spectrum, comprising:

one or more processors;

a memory; and one or more program modules stored in the memory and to be executed by the one or more processors, the one or more program modules comprise:

a first obtaining module, adapted to obtain configuration information of a transmitter of an authorized system and obtain geographic location information of candidate sense nodes; wherein the configuration information comprises: geographic location information of the transmitter of the authorized system; spectrum information of the transmitter of the authorized system and transmission power information of the transmitter of the authorized system;

a selecting module, adapted to select a designated number of the sense nodes which are closet to the transmitter of the authorized system according to the configuration information and the geographic location information;

a transmitting module, adapted to inform the sense nodes to perform spectrum sensing;

a receiving module, adapted to receive sensing results of the sense nodes; and a second obtaining module, adapted to determine information of an idle spectrum according to the sensing results;

wherein the second obtaining module is adapted to combine the sensing results to determine whether the authorized system is transmitting signals on the spectrum and obtain information of the idle spectrum according to an idle spectrum request message of a request node and a determination result on the authorized system is currently transmitting signals on the spectrum;

the idle spectrum request message carries the maximum transmission power of the request node;

the second obtaining modules is further adapted to calculate, if the request node transmits using the maximum transmission power, an inference level suffered by the authorized system which is transmitting signals on the spectrum, determine that the spectrum is idle if the interference level is lower than a predefined threshold; and determine the spectrum is not idle if otherwise.

11. The apparatus of claim 10, wherein the selecting module is further adapted to calculate a maximum propagation loss $L_{max}$ between the candidate sense nodes and the transmitter of the authorized system according to the configured transmission power information $P_S$ of the transmitter of the authorized system and a detecting threshold $P_T$;

calculate a maximum distance $d_{max}$ between the candidate sense nodes and the transmitter of the authorized system according to the maximum propagation loss $L_{max}$;

select sense nodes for each transmitter of the authorized system according to the geographic location information of the transmitter of the authorized system, the geographic location information of each candidate sense node and the maximum distance $d_{max}$.

12. The apparatus of claim 11, wherein
the selecting module is further adapted to calculate $L_{max}$[dB]=$P_S$[dB]−$P_T$[dB], and calculate $d_{max}$ through solving W($d_{max}$)=$L_{max}$, wherein W(.) denotes a function of a wireless channel propagation model.

13. The apparatus of claim 11, wherein
the selecting module is further adapted to select, from candidate sense nodes having a distance not larger than $d_{max}$ from the transmitter of the authorized system, the designated number of candidate sense nodes most close to the transmitter of the authorized system as sense nodes.

14. The apparatus of claim 10, wherein the idle spectrum request message carries the geographic location information of the request node;
the second obtaining module is further adapted to
calculate a geographic distance d between the transmitter of the authorized system and the request node according to the geographic location information of the request node and the geographic location information of the transmitter of the authorized system which is transmitting signals on the spectrum;
calculate a receiving signal strength $P_R$ from the transmitter of the authorized system to the request node according to the geographic distance d;
determine, if the receiving signal strength $P_R$ is lower than a detecting threshold $P_T$, that the spectrum is idle; and
determine that the spectrum is not idle if otherwise.

15. The apparatus of claim 14, wherein
the second obtaining module is further adapted to calculate $P_R$[dB]=$P_S$[dB]−L[dB], L=W(d); wherein W(.) is a function of the wireless channel propagation model, $P_S$ denotes the configured transmission power information.

16. The apparatus of claim 10, wherein the idle spectrum request message carries a list of spectrums supported by the request node;
the second obtaining module is further adapted to determine a target spectrum set according to the supported spectrum list and determine whether each spectrum in the target spectrum set is idle.

* * * * *